April 6, 1948.  B. A. EVANS  2,439,043
METHOD OF MAKING AN ENDLESS BELT
Filed May 12, 1943
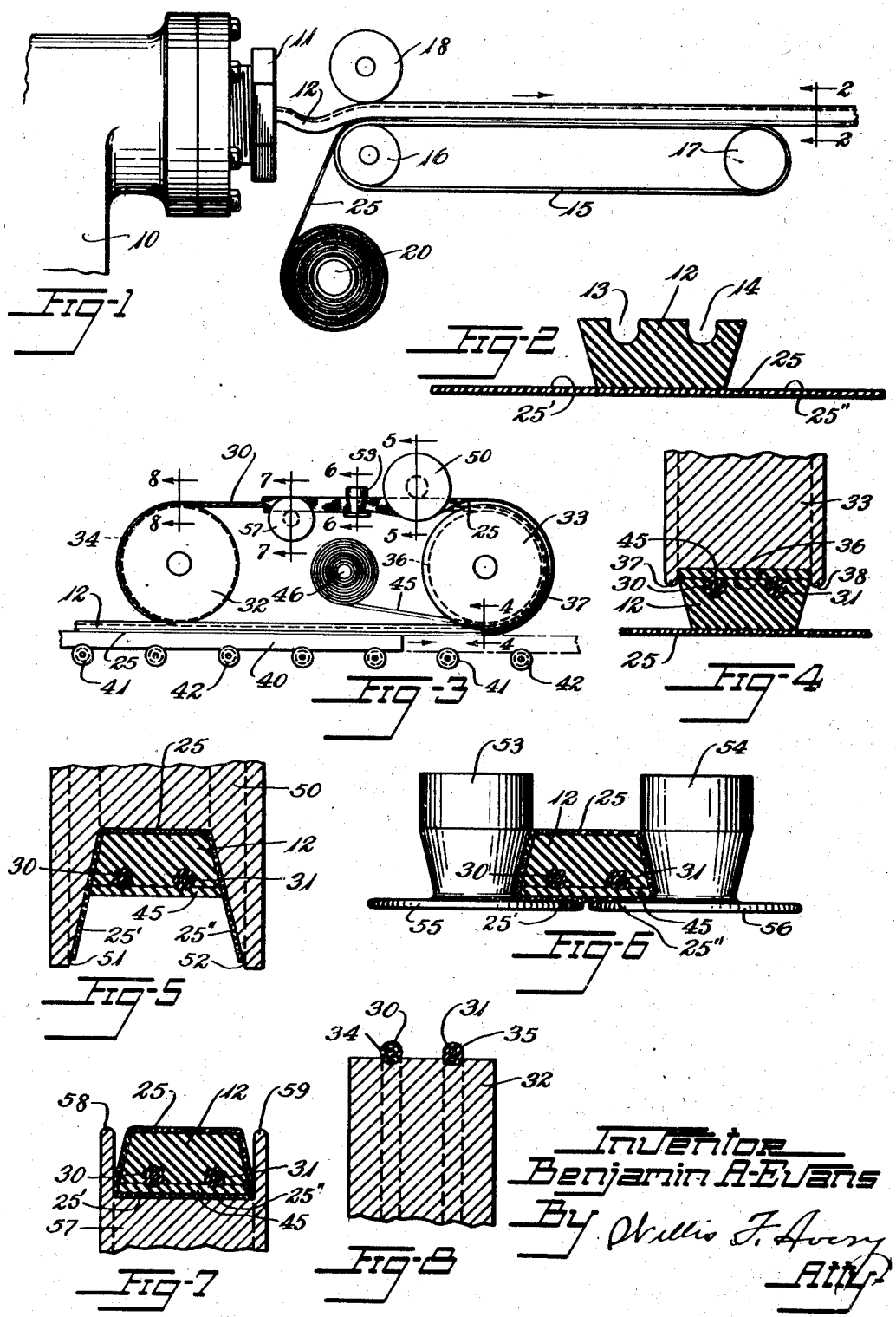
Inventor
Benjamin A. Evans
By Willis F. Avery
Atty.

Patented Apr. 6, 1948

2,439,043

UNITED STATES PATENT OFFICE 2,439,043

METHOD OF MAKING ENDLESS BELTS

Benjamin A. Evans, Cuyahoga Falls, Ohio, assignor to The B. F. Goodrich Company, New York, N. Y., a corporation of New York Application May 12, 1943, Serial No. 486,663

6 Claims. (Cl. 154—4)

This invention relates to the manufacture of power transmission belts and is especially useful in the manufacture of endless belts for use on grooved pulleys.

In the transmission of power by the use of grooved pulleys and endless belts of trapezoidal cross-section, otherwise commonly known as V-belts, it has been proposed to utilize a plurality of laterally spaced endless grommets embedded in soft rubber material and enclosed by a wear resistant cover of rubberized fabric. This construction has involved the problem of conveniently assembling the parts, especially with respect to the desired location of grommets in the rubber.

The objects of the present invention are to provide convenient and effective procedure for the manufacture of endless belts having laterally spaced grommets, and to provide uniformity of construction and high quality of the product.

These and other objects of the invention will appear from the following description and the accompanying drawings.

Of the drawings,

Fig. 1 is a side elevation of an extruding head and assembling conveyor illustrating one of the steps of the invention, parts being broken away.

Fig. 2 is a cross-section of the assembled strips, taken on line 2—2 of Fig. 1.

Fig. 3 is a side elevation diagrammatically showing apparatus for practicing other steps of the invention.

Fig. 4 is a cross-section taken on line 4—4 of Fig. 3, parts being broken away.

Fig. 5 is a cross-section taken on line 5—5 of Fig. 3, parts being broken away.

Fig. 6 is a cross-section taken on line 6—6 of Fig. 3, parts being broken away.

Fig. 7 is a cross-section taken on line 7—7 of Fig. 3, parts being broken away.

Fig. 8 is a cross-section taken on line 8—8 of Fig. 3, parts being broken away.

Referring to the drawings which show in Figs. 1 to 8 a form of apparatus suitable for practicing the procedure of the invention, the numeral 10 designates an extruding machine having a die 11 for forming a strip 12 of unvulcanized rubber or similar rubber-like material. By the term rubber-like material, applicant intends to include a material, either natural or synthetic, of a plastic resilient nature having the physical properties of an unvulcanized rubber composition and permitting its being extruded in strip form suitable for the manufacture of a belt. The strip 12 is of trapezoidal cross-section as seen in Fig. 2 and has a plurality of longitudinal grooves 13, 14 along its wider face corresponding in dimensions to the size of the grommets to be employed in making the belt, the die 11 being of such shape as to form the strip to the desired shape. For supporting the strip 12 without stretching it as it is progressively formed an endless conveyor belt 15 is trained about a pulley 16 adjacent the mouth of the die and a second pulley 17 spaced therefrom, the arrangement providing a supporting upper belt reach of considerable length. The pulley 16 is driven by any suitable means so as to drive the belt 15 at the same speed as the delivery speed of the strip from the extruder. A weighted pressure roll 18 is mounted for vertical movement over roller 16 to press the strip 12 against the belt. A supply roll 20 of strip rubberized fabric 25 to provide the cover of the belt is mounted adjacent the pulley 16 and the strip is led between the strip 12 and the belt 15 over pulley 16 so as to adhere it to strip 12. The assembled strips 12 and 25 appear as in Fig. 2 and may be cut to length to correspond to the desired belt.

Endless grommets 30, 31 are tensioned about pulleys 32, 33 supported for rotation on parallel axes, one pulley preferably being adjustable toward and from the other for tensioning the grommets. Pulley 32 has peripheral grooves 34, 35 (see Fig. 8) for spacing the grommets properly while pulley 33 has a wide flat groove 36 of substantially the width of the strip 12 formed by peripheral guide flanges 37, 38 for guiding the strip. One of the pulleys 32, 33 is adapted to be driven by power.

A table 40 is mounted for movement parallel to the reaches of the grommets on rollers 41, 42, the top of the table being spaced from the periphery of pulley 32 by a distance equal to the thickness of strips 12 and 25 assembled. The arrangement is such that the assembled strips which have been cut to the length of the desired belt may be laid on the table and fed into engagement with the grommets 30, 31 whereupon the ends of the strip are abutted.

A filler strip 45 is adapted to be fed from a supply roll 46 into the bight between the grommets and pulley 33. The arrangement is such that strip 12 is driven by pulley 32 and the grommets 30, 31 are received in the grooves 13, 14, and the strip 45 is adhered to strip 12, the assembled strips passing about pulley 33. Strip 25 is made wide enough to enclose strip 12 completely. As the assembled strips enter the upper reach of the spaced grommets, a grooved idler pulley 50 having flared flanges 51, 52 corresponding in angle to the sides of the strip 12 engages the unadhered wings 25', 25" of the strip 25 and presses them against the sides of the strip 12 as seen in Fig. 5 to adhere them thereto. The trailing end of the strip 25 is cut from the roll thereof by hand or otherwise before it reaches the strip 12 so that its ends abut or overlap during assembly.

At a later position along the reach a pair of free-running rollers 53, 54, preferably adjustable toward and from each other, engage the sides of the assembly and have radial flanges 55, 56 which turn the remaining portions of the wings 25', 25", over the face of the strip 45, as seen in Fig. 6 into adhesive engagement therewith.

At a still later position, a free-running roller 57, preferably having guiding side flanges 58, 59 (see Fig. 7) engages the lower side of the assembly and adheres the wings 25', 25" to the strip 45.

The strip 45 may be either a strip of rubber composition or fabric, or may be an assembly of strips preferably rubberized fabric.

The apparatus described as used for carrying out the procedure is merely illustrative and other apparatus may be employed or the method may be accomplished partly by manual manipulation.

In practicing the method rubber or similar rubber-like composition is extruded to the desired shape with longitudinal grommet receiving grooves in its face and is adhered, preferably simultaneous with extrusion, to the face of a fabric cover strip, a plurality of grommets are tensioned and arranged in parallel relation, the extruded strip is progressively applied to the grommets with its grooves engaging over them, a filler strip is progressively applied over the grooves, and the cover strip is progressively folded about the assembled strips. A second covering strip may then be applied over the first if desired. Upon vulcanization of the belt, preferably with the customary molding pressure, the butted ends of the rubber strips 12 and 45 become permanently united to one another, as do all the components of the belt.

Variations may be made without departing from the scope of the invention as it is defined by the following claims.

I claim:

1. The combination of steps in a method of making an endless belt which comprises arranging a plurality of endless grommets in spaced-apart parallel relation, forming a strip of unvulcanized rubber-like material with spaced-apart longitudinal grooves, and applying said strip to the spaced grommets with its grooves each receiving a grommet.

2. The combination of steps in a method of making an endless belt which comprises arranging a plurality of endless grommets in spaced-apart parallel relation, extruding unvulcanized rubber-like material to form a strip having longitudinal grooves, and applying the strip to the grommets with its grooves each receiving a grommet.

3. The combination of steps in a method of making an endless belt which comprises supporting a plurality of endless grommets in spaced-apart relation, applying a longitudinally grooved strip of unvulcanized rubber-like material to the spaced grommets with its grooves each receiving a grommet, adhering a second strip of material over the grooves, and enclosing the strips and the grommets in a strip of covering material.

4. The combination of steps in a method of making an endless belt which comprises extruding unvulcanized rubber-like material to provide a longitudinally grooved strip, tensioning an endless grommet, and applying the strip to the tensioned grommet with its groove receiving the grommet.

5. The combination of steps in a method of making an endless belt which comprises forming unvulcanized rubber-like material to provide parallel longitudinal grooves in the rubber-like material, progressively applying the rubber-like material onto a longitudinal zone of a strip of covering material, tensioning a plurality of endless grommets in spaced-apart parallel relation, and progressively assembling the rubber-like material and covering material with the grommets while enclosing the grommets in the grooves.

6. The combination of steps in a method of making an endless belt which comprises extruding unvulcanized rubber-like material to provide parallel longitudinal grooves in the rubber-like material, progressively applying the rubber-like material onto a longitudinal zone of a strip of covering material, tensioning a plurality of endless grommets in spaced-apart parallel relation, progressively assembling the rubber-like material and covering material with the grommets in the grooves, and progressively folding the covering material about the rubber-like material and the grommets.

BENJAMIN A. EVANS.

REFERENCES CITED

The following references are of record in the file of this patent:

UNITED STATES PATENTS

| Number | Name | Date |
|---|---|---|
| 1,661,069 | Hartung | Feb. 28, 1928 |
| 1,747,856 | Burkley et al. | Feb. 18, 1930 |
| 1,924,067 | Gerstenslager | Aug. 22, 1933 |
| 1,969,067 | Freeman | Aug. 7, 1934 |
| 2,137,887 | Abbott | Nov. 22, 1938 |
| 2,195,126 | Smith et al. | Mar. 26, 1940 |
| 2,233,294 | Merrill et al. | Feb. 25, 1941 |
| 2,239,635 | Walton, Jr. | Apr. 22, 1941 |
| 2,287,947 | Shoemaker | June 30, 1942 |